United States Patent [19]

Lindow et al.

[11] Patent Number: 4,707,610

[45] Date of Patent: Nov. 17, 1987

[54] METHOD AND APPARATUS FOR MEASURING SURFACE PROFILES

[75] Inventors: James T. Lindow, Saratoga; Simon D. Bennett; Ian R. Smith, both of Los Gatos, all of Calif.

[73] Assignee: SiScan Systems, Inc., Campbell, Calif.

[21] Appl. No.: 850,983

[22] Filed: Apr. 11, 1986

Related U.S. Application Data

[63] Continuation-in-part of Ser. No. 752,160, Jul. 3, 1985, which is a continuation-in-part of Ser. No. 725,082, Apr. 19, 1985.

[51] Int. Cl.⁴ ............................................... G01V 9/04
[52] U.S. Cl. ................................... 250/560; 250/563; 356/376
[58] Field of Search ............... 250/560, 571, 572, 563; 356/244, 376; 350/507, 508

[56] References Cited

U.S. PATENT DOCUMENTS 4,473,750 9/1984 Oshida et al. ................... 356/376 X Primary Examiner—Eugene R. LaRoche
Assistant Examiner—Robert J. Pascal
Attorney, Agent, or Firm—Robert S. Kelly

[57] ABSTRACT

A system for determining surface profiles of specimens such as semiconductor wafers and for making linewidth measurements thereon includes a drive for mounting the wafer for oscillatory movement along a line and an optical imaging system overlying the wafer for focusing a beam on a small spot on the wafer and including a photodetector for detecting the reflected spot from the wafer. The spot is scanned along the line on the wafer while the focal depth of the imaging system is progressively changed while the photodetector and connected digital circuitry generate a plurality of spaced output signals for each scan along the line so that data comprised of a series of spaced signals are provided at a plurality of focus levels extending through the surface profile of the wafer. Computer means are provided for analyzing the data and providing a graphical output of the surface profile from which accurate linewidth measurements are made. Such computer means also provides an adjustment factor for measuring a linewidth in the same area while making a scan only at a single focus level so that the remainder of the area can be scanned rapidly.

23 Claims, 17 Drawing Figures

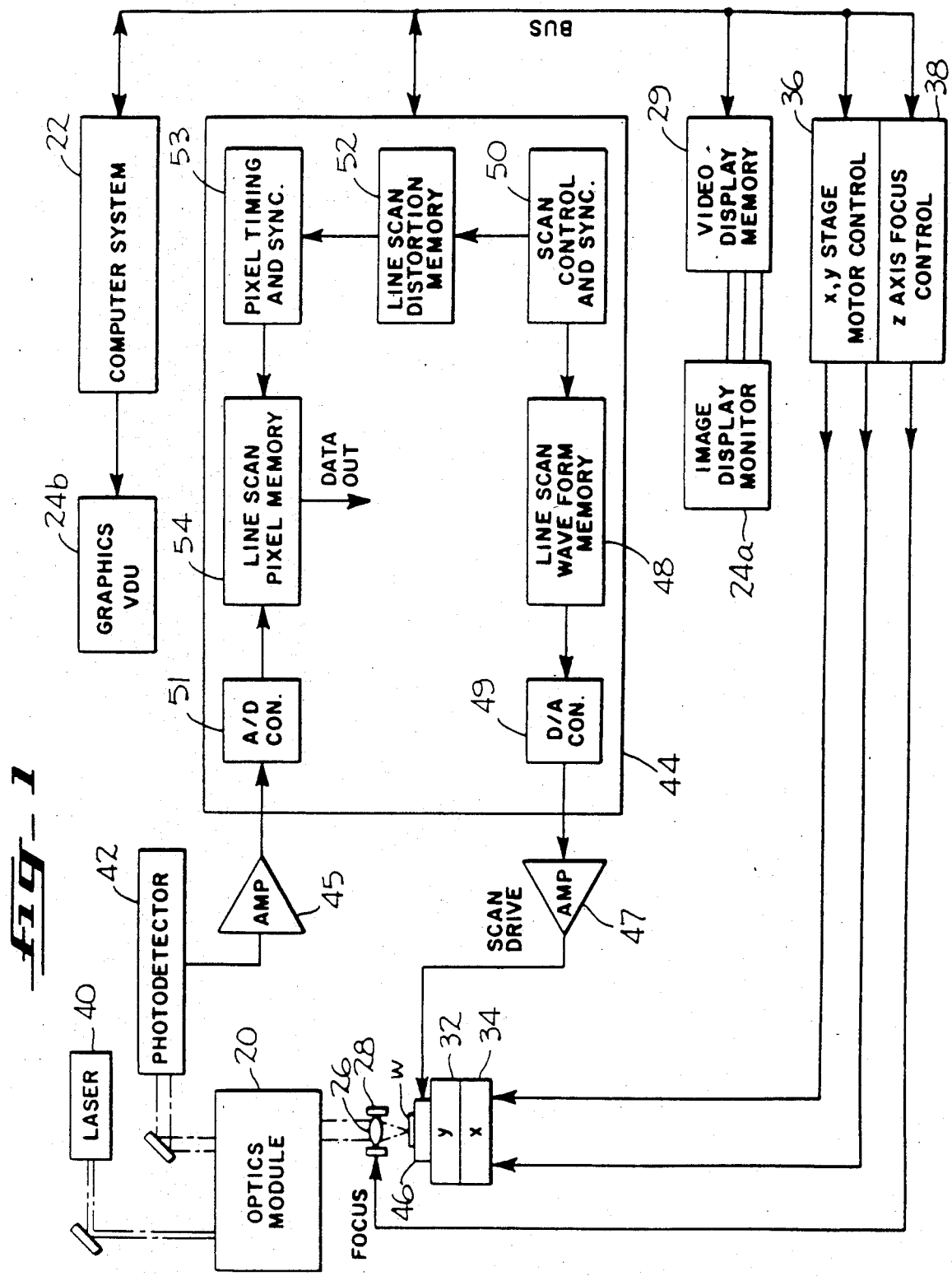
Fig_1

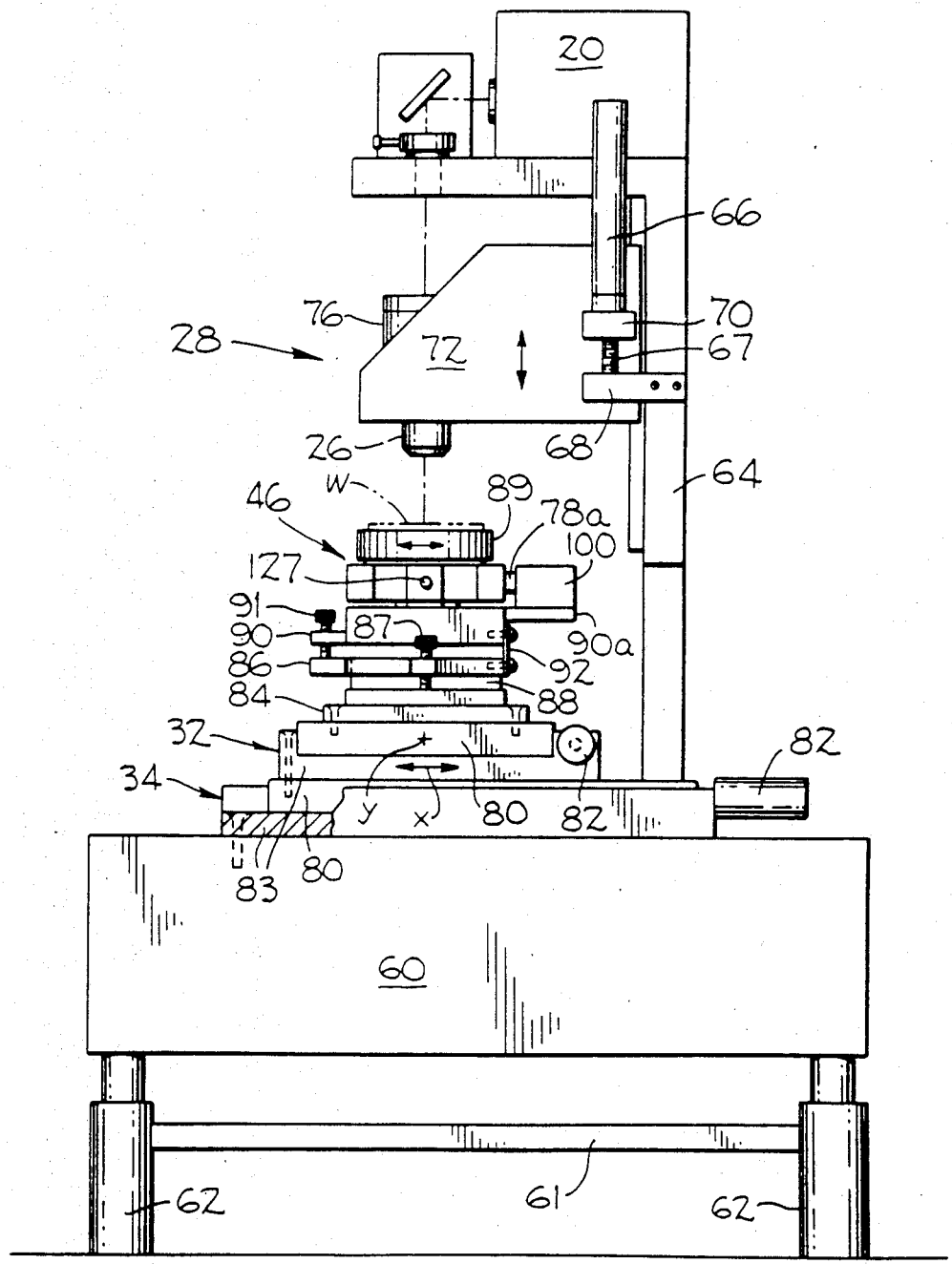
_fig_2

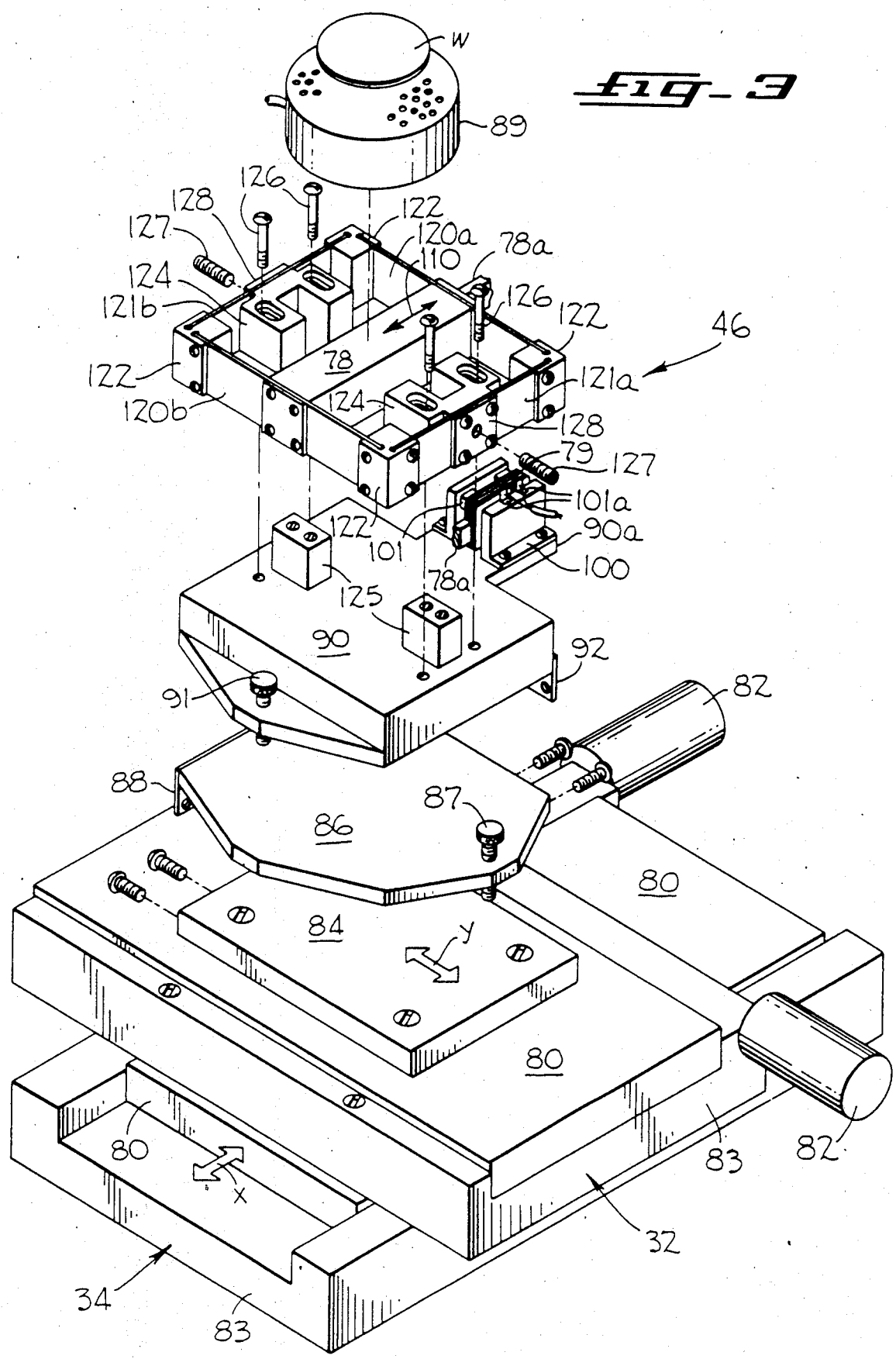

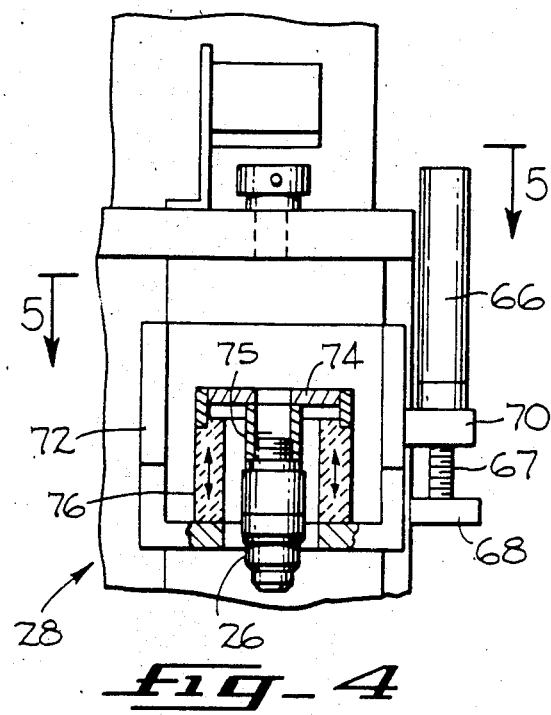
fig_4
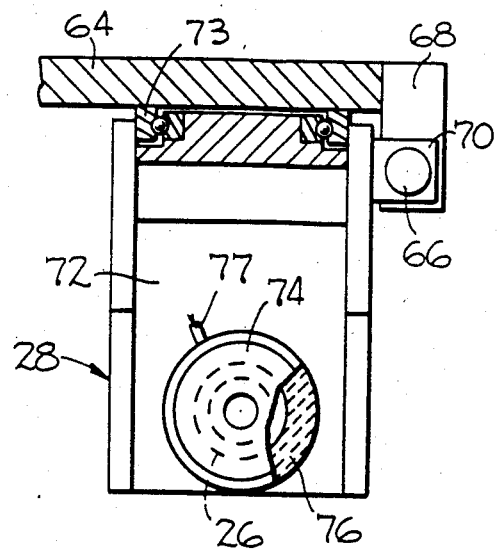
fig_5
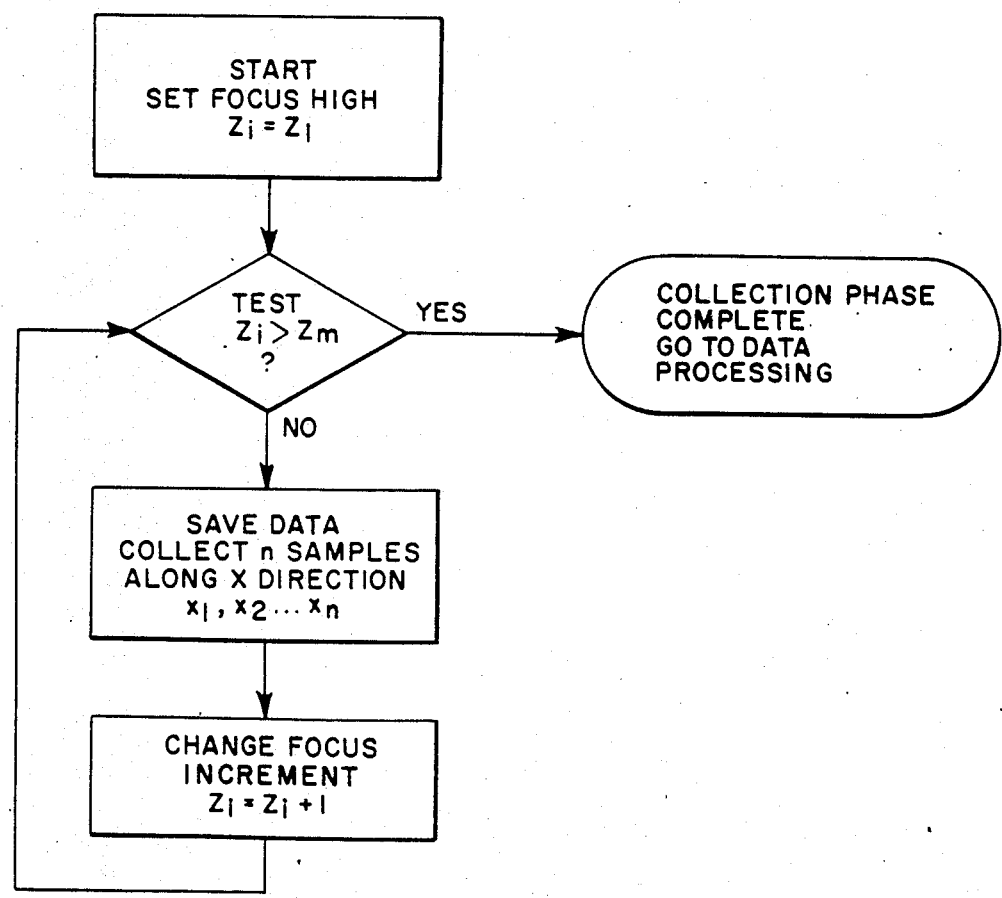
fig_7A

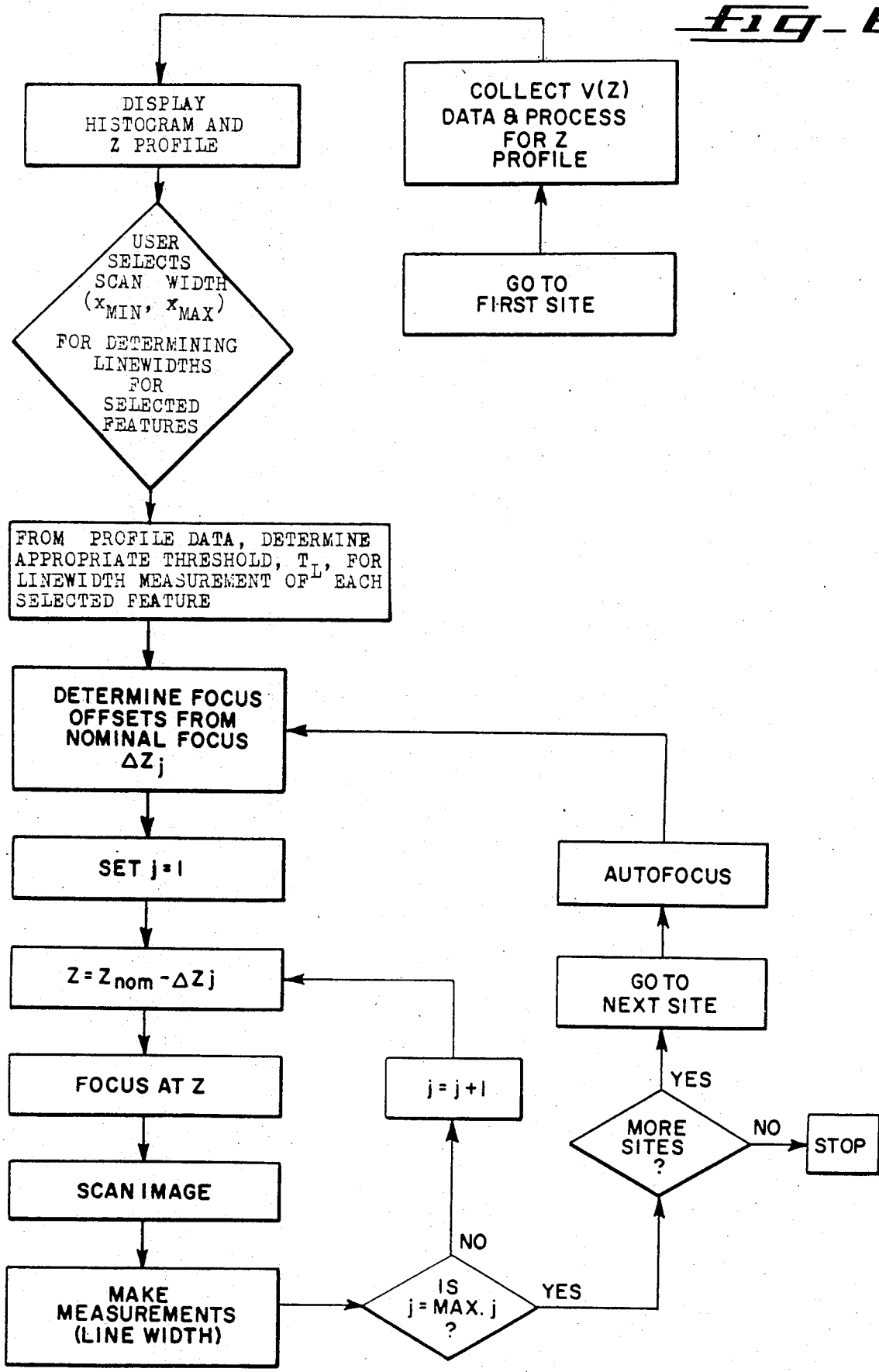
fig_6

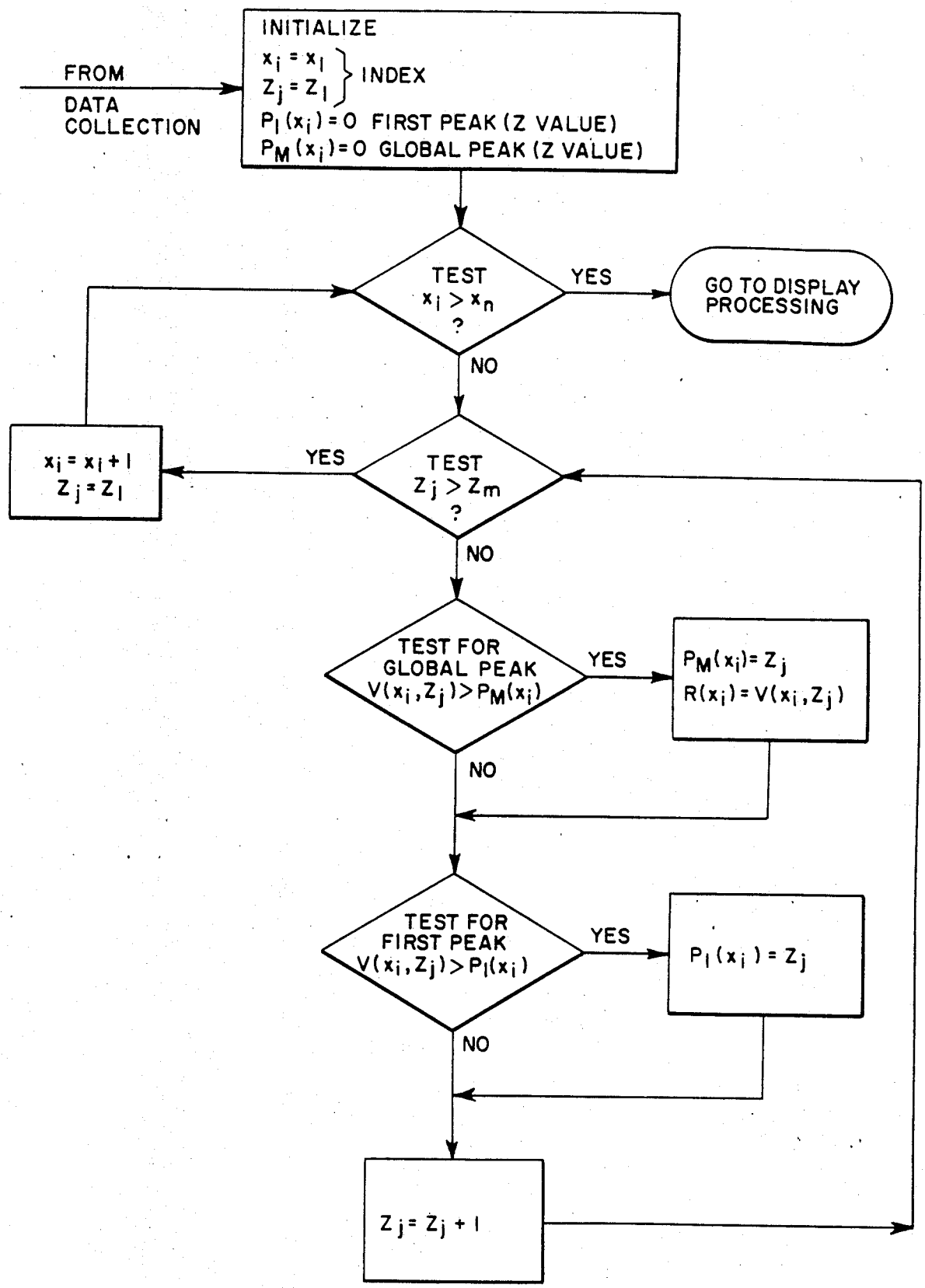
fig_7B fig_8
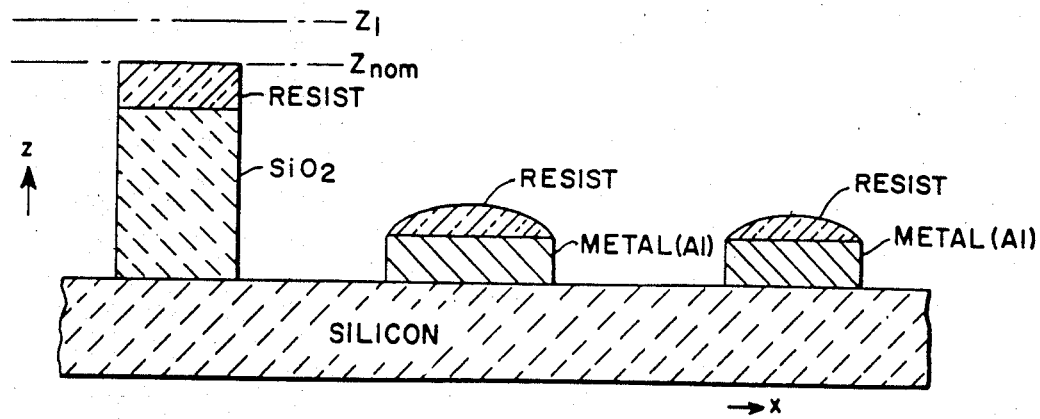
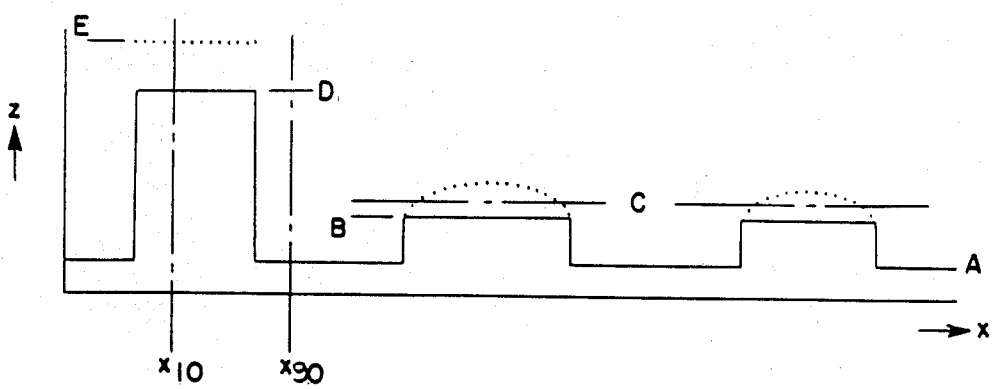
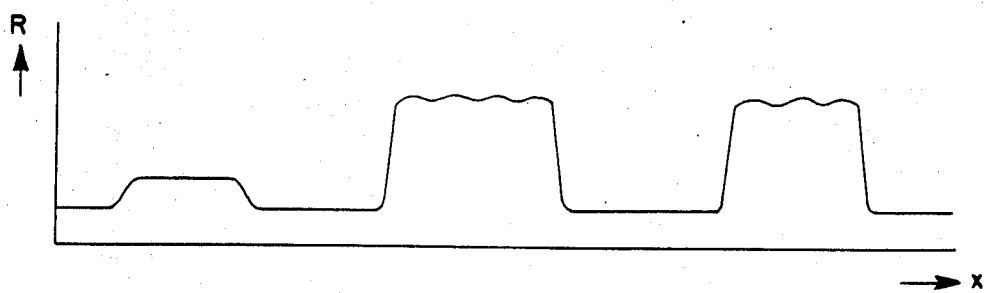
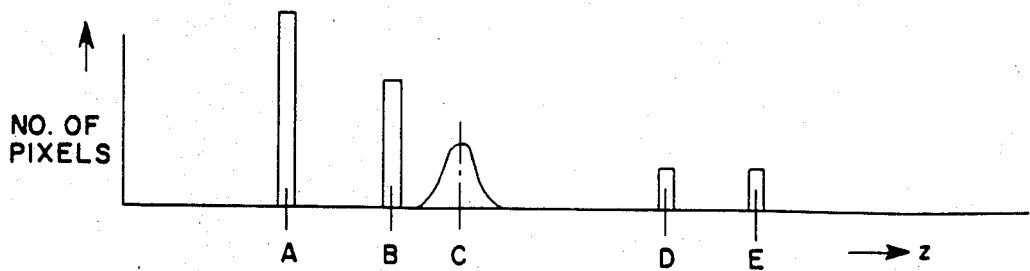

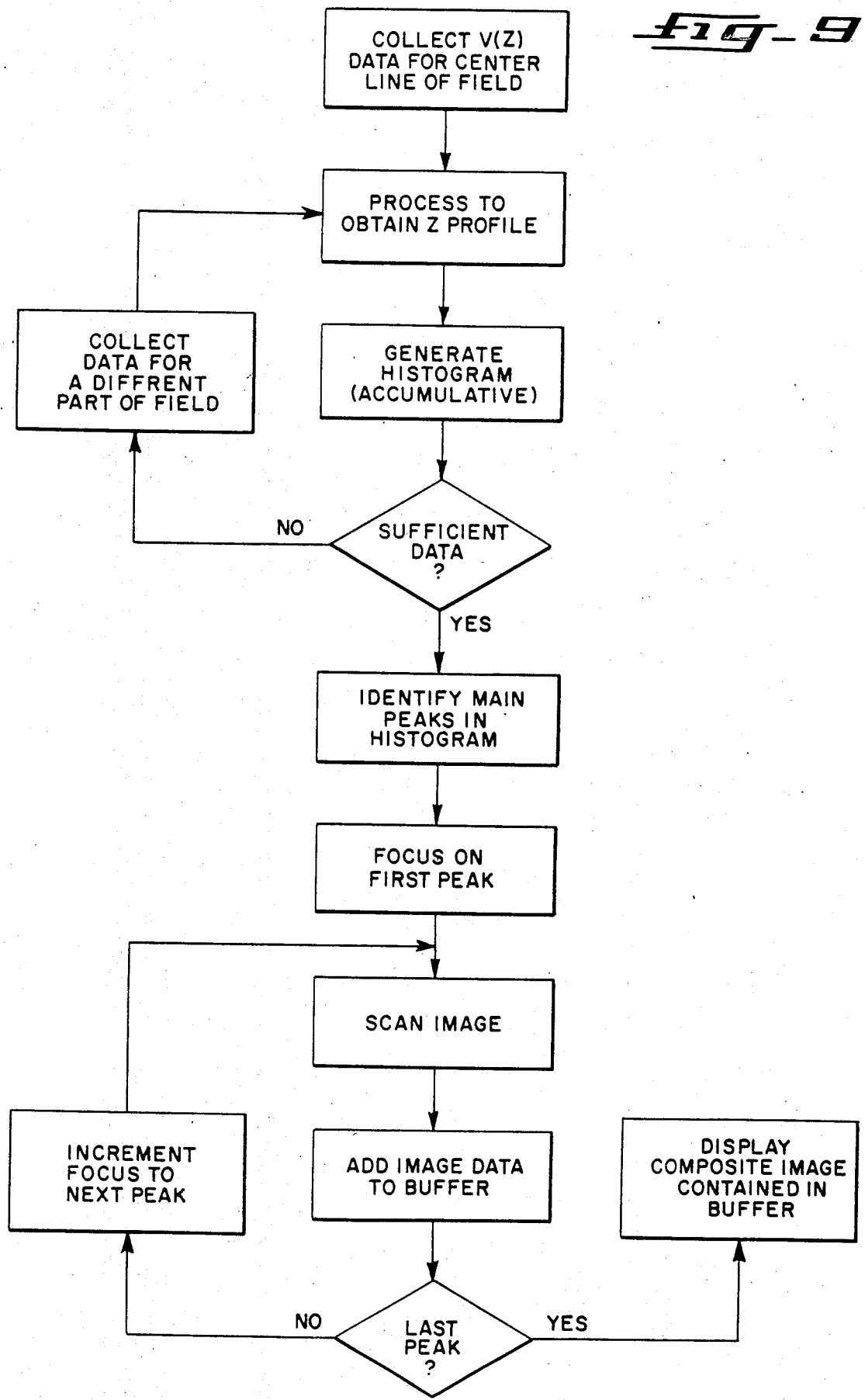

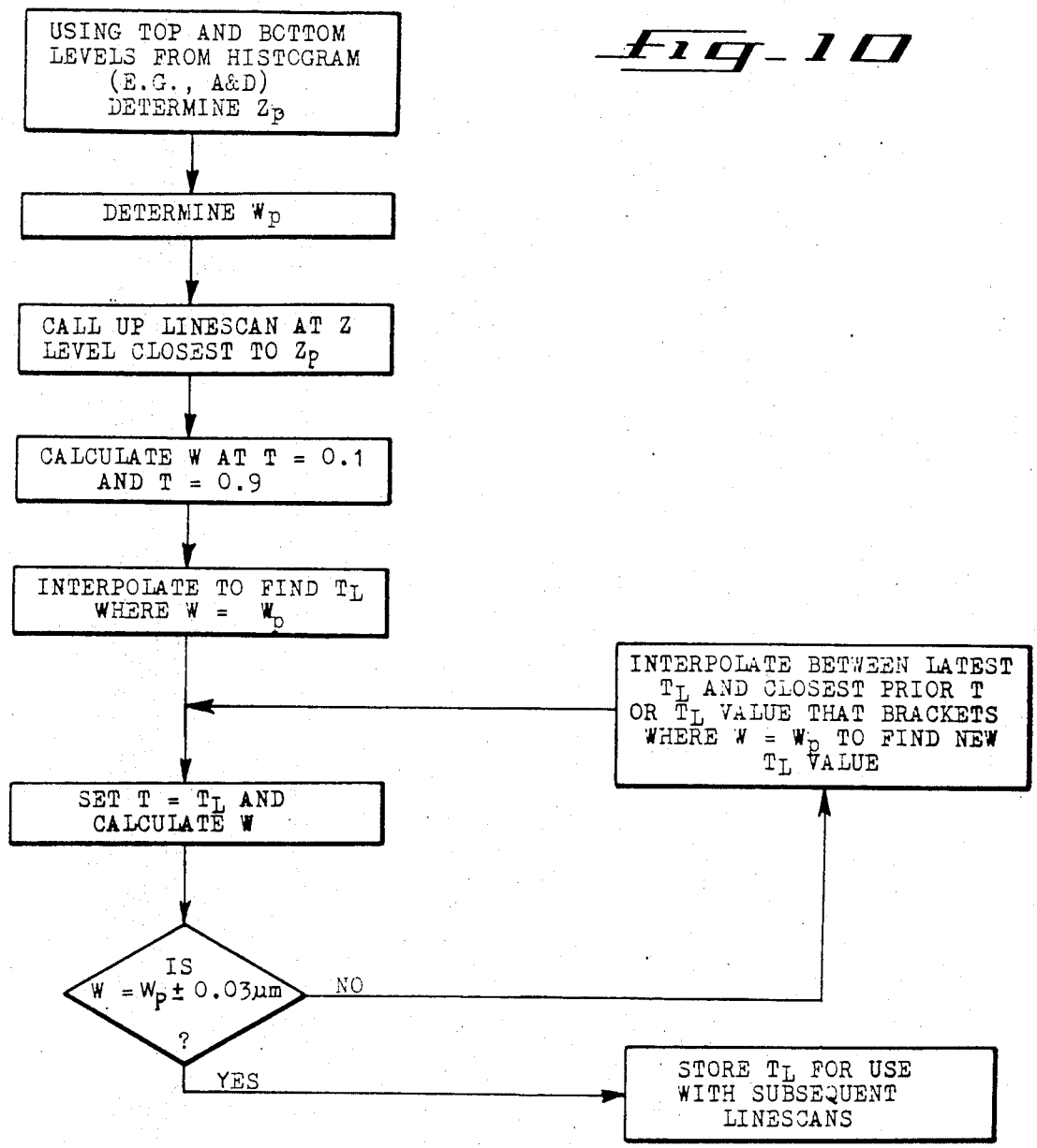
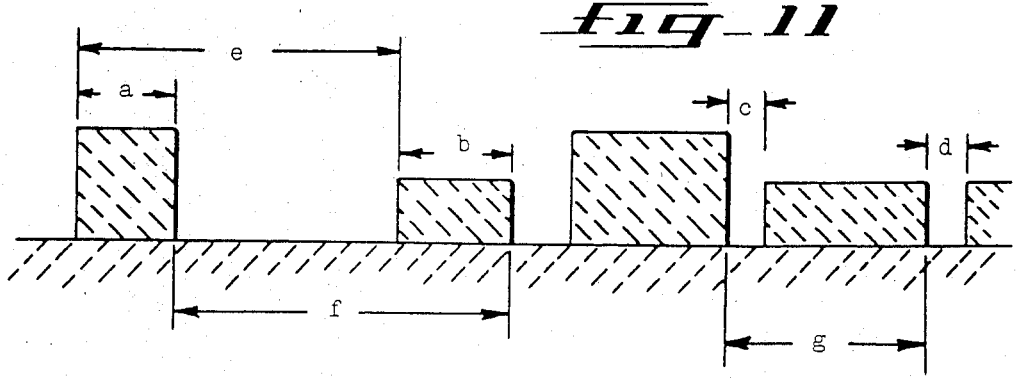

fig_12
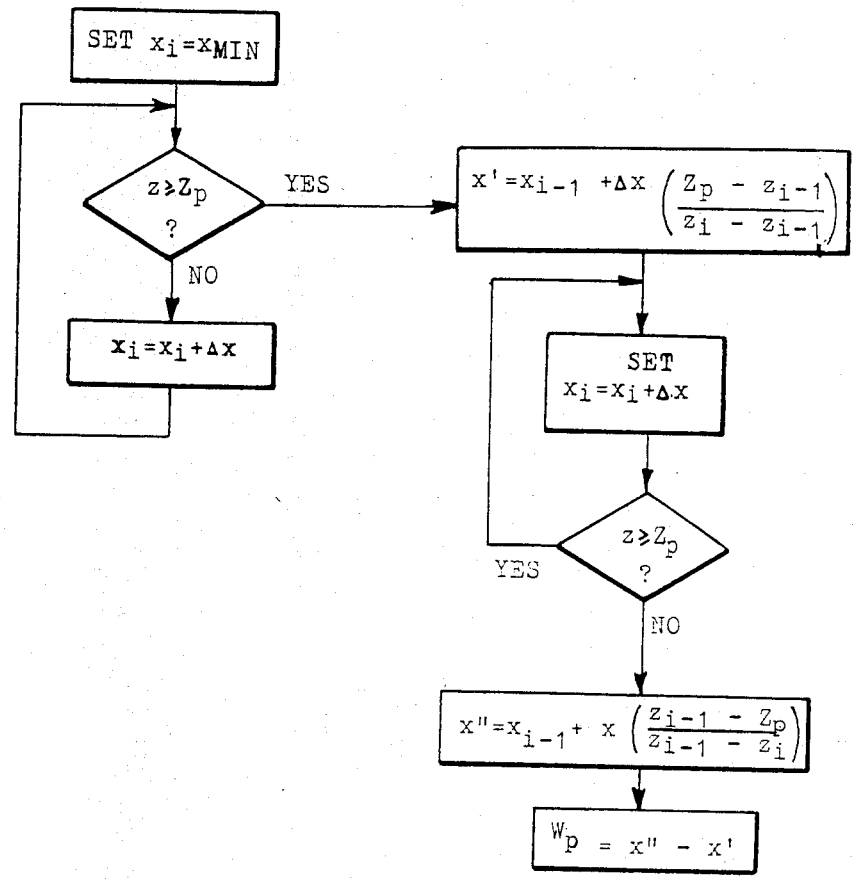
fig_13
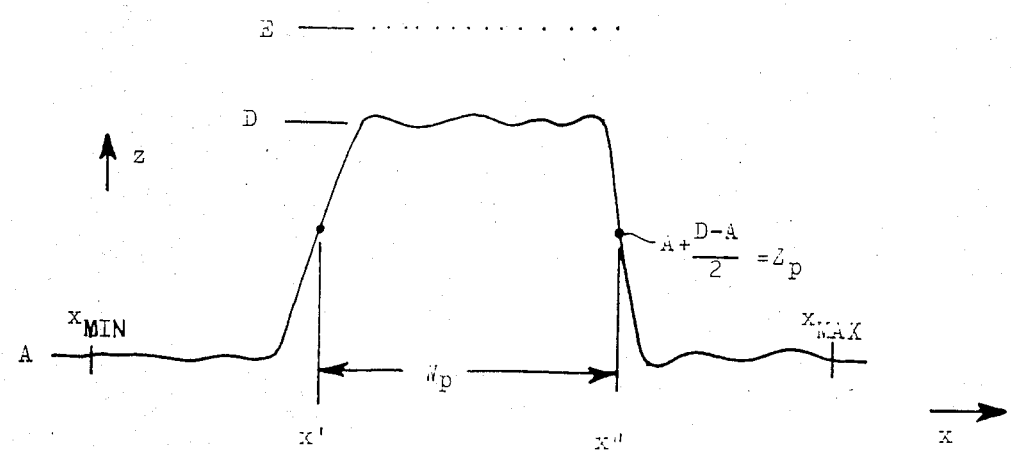

*fig_14*
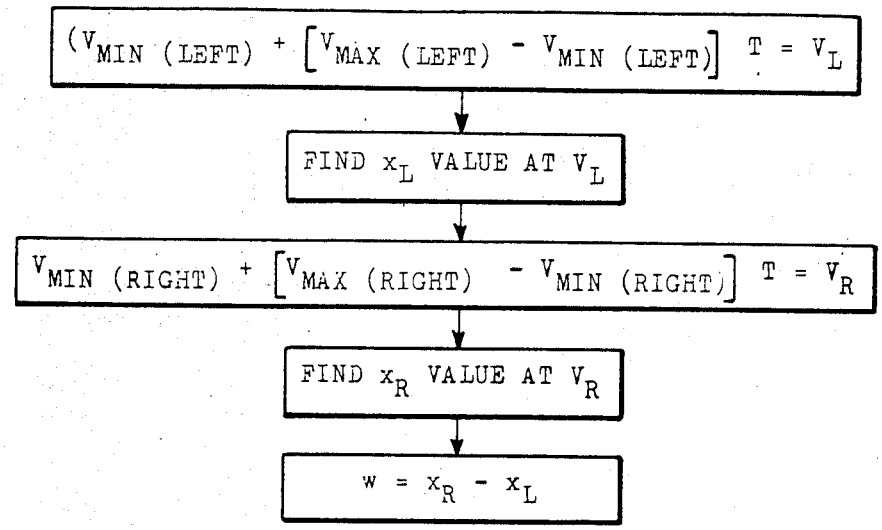
*fig_15*
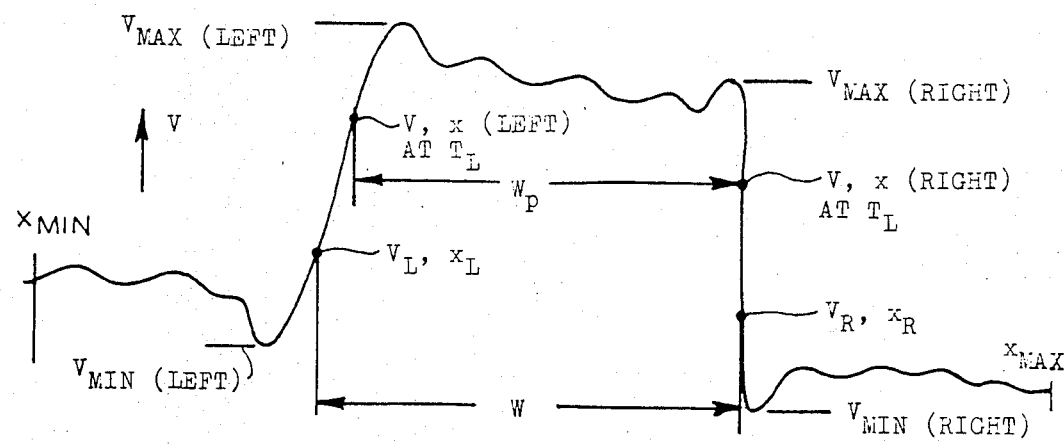

METHOD AND APPARATUS FOR MEASURING SURFACE PROFILES

CROSS REFERENCE TO RELATED APPLICATION

This application is a continuation-in-part of U.S. patent application Ser. No. 752,160, filed July 3, 1985, by James T. Lindow et. al., and entitled Method and Apparatus for Determining Surface Profiles, which is a continuation-in-part of U.S. patent application, Ser. No. 725,082, filed Apr. 19, 1985 by James T. Lindow et al., and entitled Semiconductor Wafer Scanning System.

BACKGROUND OF THE INVENTION

1. Field of the Invention

The present invention pertains to systems for scanning surface patterns on specimens such as semiconductor wafers or the like, and more particularly, it pertains to methods and apparatus for accurately obtaining measurements of the surface profile of such specimens.

2. Description of the Prior Art

In the scanning of semiconductor wafers or the like to detect surface pattern defects, a variety of techniques have been utilized that take advantage of various forms of microscopes, both optical and acoustical, having high degrees of image resolution. In optical imaging systems generally, devices similar to T.V. cameras have been utilized wherein electromagnetic radiation is reflected from a relatively large spot on the wafer and processed through an optical system and photodetector device to provide a multi-intensity image which, either digitally or by analog means, can be recreated on an appropriate output device, such as a CRT.

The scanning of semiconductor wafers typically provides a means whereby certain processing defects can be detected or whereby linewidth measurements can be made so as to determine whether or not the manufacturing process has been performed correctly. Since the tolerance limits for the dimensions which must be detected and measured accurately are in the micron or even submicron range, microscope imaging systems for scanning specimens with a high degree of resolution are generally required. Laser beams can be focused through such optical imaging systems with a very narrow depth of field. Then, by scanning the laser beam along the top surface of the semiconductor wafer, the conductive traces or conductor pattern lines on the wafer can be measured by utilizing special detector devices to denote the edges of such lines.

It has been generally recognized that with wafer imaging and scanning systems of the aforedescribed type the beam focus level can be adjusted as it is scanned across the wafer so as to track the changing surface level thereof by noting when the reflected image moves slightly out of focus and by adjusting the spacing between the wafer and the imaging system (by moving either one relative to the other) so as to continually maintain the reflective surface of the wafer at the proper focus. Prior art patents which describe such imaging systems include U.S. Pat. No. 4,505,585 to Yoshikawa et al and U.S. Defensive Publication T102,104 to Kirk et al.

SUMMARY OF THE INVENTION

With the present invention, methods and apparatus are provided for systematically measuring the cross-sectional profile, and particularly the linewidths, within a given area on the semiconductor wafer surface with a generally greater degree of accuracy than that provided by the systems of the prior art.

With the method and apparatus of the present invention, an optical imaging system is provided to project a sharply defined beam onto a small spot upon the wafer surface and to detect the reflected spot with respect to a measurable characteristic of the reflected beam indicative of a reflective surface at the focal plane. The optical imaging system and the wafer are relatively moved in a plane generally parallel to the surface of the wafer so that the projected spot scans a line across a portion or given area of the wafer, and means are provided for recording and storing a signal representative of the measurable characteristic at a plurality of very closely spaced positions along the scan line. The focus level of the imaging system is successively changed by moving the wafer and imaging system closer together or further apart after each pass along a scan line until a plurality of scans have been made completely passing through the relevant surface detail of the wafer. Then, for each single recording position along the scan line, that focus level of the system is determined wherein a signal most characteristic of a surface indication (e.g.. a maximum reflected intensity signal) was obtained. The serial accumulation of the thus determined focus levels for each of the closely spaced positions along the scan line represents a cross-sectional profile of the surface of the wafer along the scan line. This surface profile information, or data, is then utilized for directly making a pattern linewidth measurement.

Once a linewidth measurement is provided by making a measurement utilizing the full profile data, such measurement can be compared with a characteristic profile obtained using only that data provided by a single scan at a single focal depth along the scan line. A depth offset distance can then be computed where the linewidth on the single scan characteristic profile equals the measured linewidth from the full profile data. This depth offset distance lwhich, for example, might correspond to the relative distance between measured maximum and minimum data levels on the single scan characteristic profile) is then used as a measuring factor during further scanning of an area of the wafer along scan lines generally parallel to the initial scan line. Such area of the wafer can therefore be scanned at a single focal depth to obtain reliable linewidth measurements.

BRIEF DESCRIPTION OF THE DRAWINGS

FIG. 1 is a diagrammatic representation of the semiconductor wafer scanning and linewidth measuring system of the present invention.

FIG. 2 is a side elevation, partially in section, of the mechanical portion of the apparatus of the present invention.

FIG. 3 is an exploded isometric view of the scanner and x-y planar drive mechanism of the system of the present invention.

FIG. 4 is a front elevation, partially in section, of the focus control device of the apparatus of FIG. 2.

FIG. 5 is a section taken along line 5—5 of FIG. 4.

FIG. 6 is a flow chart depicting the programming for the computer which controls the various operative components of the system of the present invention.

FIGS. 7A, 78, and 7C collectively comprise a flow chart depicting the subroutine of the program of FIG. 6 for collecting, processing and displaying the data for the cross-sectional profile.

Figure 7C:
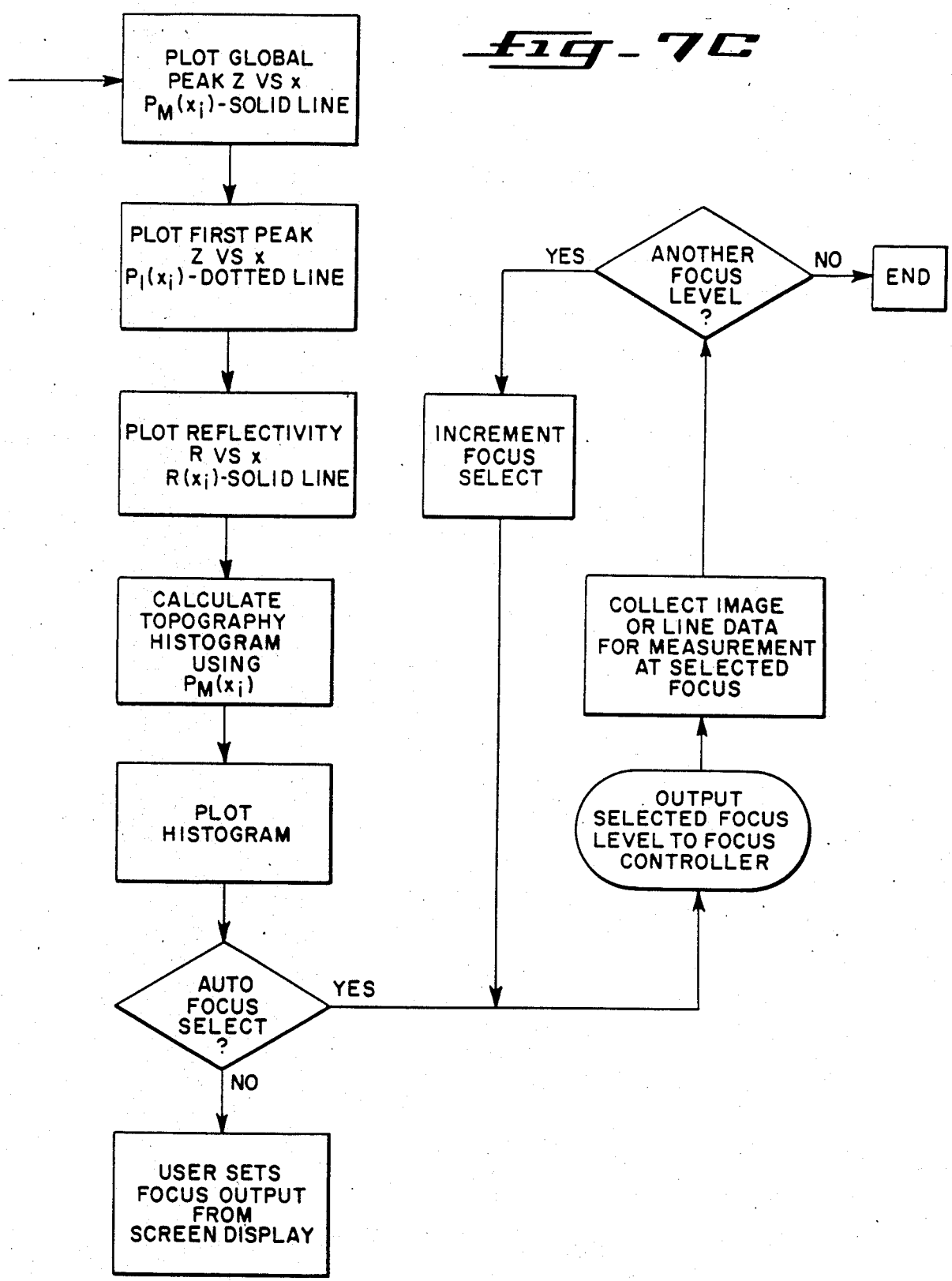

FIG. 8 is a cross-sectional illustration of a portion of a scanned semiconductor wafer surface and the corresponding profile and reflectivity displays and focal level histogram obtained with the system of the present invention.

FIG. 9 is a flow chart depicting the programming for the system of the present invention wherein a "superfocus" image is obtained and displayed.

FIG. 10 is a flow chart depicting the subroutine for the programming step of FIG. 6 of determining the threshold level ($T_L$) for a linewidth measurement.

FIG. 11 is a diagrammatic illustration of a semiconductor wafer surface illustrating the types of linewidths which might be measured with the system of the present invention.

FIG. 12 is a flow chart depicting the subroutine for the programming step of FIG. 10 of determining the profile linewidth measurement ($W_p$).

FIG. 13 is an illustration of a portion of the semiconductor wafer surface profile and the linewidth measurement thereon as determined by the subroutine of FIG. 12.

FIG. 14 is a flow chart depicting the subroutine for the programming step of FIG. 10 of calculating a linewidth measurement (w).

FIG. 15 is an illustration of a portion of a single scan characteristic profile at a single focal depth indicating the measurements calculated by the subroutine of FIG. 14.

DESCRIPTION OF THE PREFERRED EMBODIMENT

The linewidth measuring technique of the present invention is adapted to be carried out by and to be useful with a wafer scanning system such as shown in FIG. 1 and more specifically described and claimed in our copending U.S. patent applications Ser. No. 725,082, filed Apr. 19, 1985, and entitled "Semiconductor Wafer Scanning System" and Ser. No. 752,160, filed July 3, 1985, and entitled "Method and Apparatus for Determining Surface Profiles". The disclosure of these prior applications are herein incorporated by reference into the present application, and reference to such applications may be had for a more detailed explanation of the apparatus of the present invention and the method of operation thereof.

Referring now to FIG. 1, which very schematically illustrates the mechanical apparatus of the present invention and, in block diagram form, the circuitry of the present invention, it will be seen that an optics module 30 is provided to focus a sharply defined beam from a laser source 40 on a small spot upon an underlying semiconductor wafer, w. The optics module comprises a confocal optical imaging system which is controlled by and provides data information signals to a computer system 22. The computer outputs information to various display units including an image display monitor 24a (where the "superfocus" image of the entire scanned area is displayed) and a graphics video display unit 24b (where the profiles, graphs and histograms are displayed). The surface of the semiconductor wafer, w, to be inspected by the system underlies the optical imaging system and extends in a plane generally perpendicular to the projected beam. The wafer is arranged to be moved in this plane in x and y orthogonal directions by x and y stages 34, 32, respectively and also by a vibratory scanning mechanism 46 aligned for movement in the x direction. Under the control of appropriate signals from the computer system 22, the x and y stages are driven by conventional motor control circuitry 36. Movement in the z direction, i.e., in a direction generally parallel to the light beam projected from laser source 40, is accomplished by a focus control mechanism 28 which shifts an objective lens 26 (the last element of the optical system) over very small vertical distances in order to change the focal plane of the optical system. The focus control mechanism is operated from the computer system through a focus control signal from conventional control circuitry 38 to shift the lens 26 up or down. The beam from laser source 40 is sharply focused with a very narrow depth of field, and it is adapted to be reflected from a surface on wafer w (if one is present) at the focal plane back through the optical system to a photodetector 42. The signal from the photodetector is sampled and digitized by the control circuitry 44 and the projected spot on the surface of wafer w. These digital signals are provided as a function of the focus level, z, and also as a function of separate, closely spaced positions in the x-y plane. Since the optical system has a very narrow depth of field, reflected intensity peaks as the focal plane coincides with an underlying reflective surface and drops off rather sharply as the wafer surface is moved away from the focal plane. Thus the height of the wafer at any particular planar (x,y) position thereon can be readily detected by operating the focus control mechanism 28 to achieve a maximum output signal representing the intensity of the reflected light. It is upon this fundamental principle that the present invention is based. The computer system 22 tracks both the x, y positions of the wafer with respect to the beam and the z level focal plane location of the beam and coordinates this information with the intensity signals from photodetector 42 in order to provide a three dimensional output representation of the portion of the wafer that is scanned.

As pointed out previously, the wafer, w, is moved in the horizontal plane by x and y stages 34 and 32, respectively, which are controlled by x, y stage motor control circuitry 36 under the monitoring of the computer system 22. The stages 32, 34 comprise conventional precision translation tables provided with optical position encoders for submicron resolution and accuracy. The motor control circuitry 36 is also conventional in nature providing drive signals for moving the stages and including A/D circuitry for receiving and processing the signals from the position encoders so as to accurately monitor the position of the wafer at any given instant. The z-axis focus control circuitry 38 provides an output voltage for the focus control mechanism 28 which, in the present instance, comprises a piezoelectric crystal that expands or contracts in the vertical plane and responds to the applied voltage to shift the relative vertical position of objective lens 26.

The control circuitry 44 for the entire system is adapted to receive a continuous input light intensity signal from the photodetector 42 through amplifier 45 and synchronize this data with the scanner 46 position information. The control circuitry 44 also serves to output a scan drive signal (a sinosoidal wave form) to the vibratory scanning mechanism 46 through an amplifier 47. The scanning mechanism 46 vibrates the wafer rapidly in the x direction. The stage, or linear translator 32, may be adapted to simultaneously move the wafer w slowly in the y direction during the vibratory scanning movement in the x direction when it is desired to provide a three dimensional scanning of an entire area (or site) on a wafer being explained in detail in the aforementioned copending U.S. patent application Ser. No. 725,082. As will be explained in greater detail hereinafter, the profiling technique of the present invention requires that the scanner 46 move only in the x direction making a repeated number of scans over the same line on the wafer while incrementally changing the level of lens 26 through focus control mechanism 28 after each individual scan.

In the control circuitry 44 it will be seen that the scan drive voltage is provided digitally out of the line scan wave form memory circuitry 48 and that a D/A converter 49 converts the digital signals to an analog signal for appropriate amplification by the amplifier 47. The memory 48 is addressed by scan control and synchronization circuitry 50. The incoming analog signal from the photodetector 42 is converted to a digital signal by A/D converter 51. Since the scanning mechanism 46 carrying the wafer, w, will move at a varying linear velocity as the wafer, w, is scanned, the timing of the digital photodetector signal sampling is such that the recorded digital signal information will correspond to generally uniformly spaced positions along the scan line on the wafer so that a distortion free image of the wafer can be created in the ouput devices 24a and 24b. In order to accomplish this objective, a line scan distortion memory 52 is provided to control the timing between the samples. The timing information from memory 52 is utilized by pixel timing and synchronizing circuitry 53 which controls a line scan pixel memory 54 that accepts and stores the digital input signals at the appropriate times. Each sampled signal (from the photodetector) corresponds to a pixel which is a representation of a very small incremental area on the wafer with the sampled signal at the time being a measurement of the reflected light from such incremental area. For a further and more complete description of the control circuitry 44 reference is again made to our aforementioned copending U.S. patent application Ser. No. 725,082.

The mechanical structure which comprises the semiconductor wafer scanning system is shown in FIG. 2 through 5. Referring first to FIG. 3, it will be seen that the entire wafer drive apparatus and optical system is arranged to be mounted upon a large surface plate 60 which is seated upon a table 61 and isolated therefrom by four piston and cylinder type air springs 62 located so as to support each corner of the surface plate. A general frame structure 64 is elevated above the surface plate 60 to provide support for the optics module 20 including the vertically shiftable focus control mechanism 28.

The details of the focus control mechanism are best shown in FIGS. 2, 4, and 5. The movable objective lens 26 will be seen to be mounted within a cage 72 open at the top and the front and with a back face (FIG. 5) adapted to slide within track 73 on the upright face of the frame structure 64. A support bracket 70 is attached to one side of cage 72 projecting outwardly therefrom to support a DC servo motor 66 with a projecting lead screw 67 thereof being adapted to engage the upper face of a support bracket 68 secured to a main upright portion of frame 64. It will be seen (from FIG. 2) that movement of the screw 67 within the motor assembly 66 serves to raise or lower the objective lens 26 relative to the underlying wafer support assembly. This lens movement is provided only for gross alignment of the optical system relative to the wafer surface, i.e., to move the optical system so that the surface of wafer w lies in the basic focal range of the optics. As will be explained presently, this gross movement will initially place the focal plane of the optical system close to but above the top surface of the wafer so that the lens 26 can thereafter be successively moved closer to the wafer as the beam from laser 40 is scanned across the wafer. Use of the motor 66 to elevate lens 26 well above the underlying wafer support structure also permits the wafer w to be readily loaded and unloaded.

The fine focusing (i.e., fine vertical adjustment) of the objective lens 26 is accomplished by means of a piezoelectric crystal 76 of generally cylindrical shape (FIGS. 4 and 5) which is attached between the base of the cage 72 and a overhead annular support member 74 which has a central hub 75 to which the upper end of the mount for lens 26 is threaded (FIG. 4). By varying the voltage to the electrical lead 77 (FIG. 5) the crystal 76 may be axially contracted or expanded in the direction of the arrows (FIG. 4) so as to, in turn, lower or elevate the objective lens 26 relative to the underlying wafer. It will be appreciated that the movement of lens 26 during the application of different electrical potentials to crystal 76 will be in the submicron range (e.g., 0.01 microns per increment) so that relatively small differences in surface levels on the face of the wafer are capable of being distinguished.

The planar (i.e., x-y) drive arrangement is best shown in the exploded view of FIG. 3. It will therein be seen that each of the x and y drive devices or stages 34, 32 is comprised of a conventional precision translation table which, in the presently described embodiment of the invention, is designed to have about six to eight inches of linear travel. These tables each include a drive motor 82 which serves to drive a slide block 80 within a channel shaped frame 83 by means of a lead screw (not shown) which is threaded to a nut attached to the slide block 80. Although not shown, it will be appreciated that each translation table includes an optical position encoder therein with submicron resolution and accuracy which serves to feed continuous position signals back to the computer 22 so that the precise position of the wafer in the x-y plane at any given time can be controlled and correlated with the reflected intensity measurements from the optical system during the operation of the apparatus. A flat lower tilt plate 84 is attached to the upper face of the slide block 80 of the upper, or y, stage translation table 32, and a middle tilt plate 86 is secured thereto by means of a leaf spring 88 which is rigidly bolted to the adjacent spaced ends of both of the tilt plates. A tilt adjusting screw 87 is threaded through the end of tilt plate 86 opposite to the mounting of spring 88 so as to bear against the upper surface of the lower tilt plate 84 so that the middle tilt plate (and the structure supported thereabove) can be tilted about the x-axis by adjustment of the screw 87. In a similar manner, an upper tilt plate 90 is secured in spaced relationship to the middle tilt plate 86 by means of a leaf spring 92 bolted to their rearward edges, thereof, and a tilt adjusting screw 91 is threaded through the forward edge of tilt plate 90 to bear against the upper surface of tilt plate 86 so as to adjustably rotate the tilt plate 90 about the y axis. It will be understood that in setting up the apparatus initially and checking it thereafter, it is essential that the tilt screws 87 and 91 are properly adjusted to insure that the surface of upper tilt block 90 lies in a perfectly horizontal plane precisely perpendicular to the path of the light beam from the overhead optical system 20.

The vibratory scanner mechanism 46, by which the wafer w is rapidly vibrated in the direction of the x-axis, is shown in detail in FIG. 3. It will be seen that the scanner mechanism comprises a rectangular structure including a pair of leaf springs 120a and 120b, for supporting, for vibratory movement a drive bar 78, and a pair of tension adjusting leaf springs 121a and 121b. The springs are arranged in a rectangular structure by attachment to four corner blocks 122 with the ends of each of the springs being tightly bolted to the corner blocks. The solid drive bar 78 is firmly attached to and extends between the midpoints of each of the vibratory leaf spring 120a and 120b. Positioned atop the drive bar 78 (see FIG. 2) is a vacuum chuck 89 which is supplied with a vacuum to hold the wafer w securely upon its flat upper surface. The rearwardly projecting end 78a of the drive bar 78 mounts a coil 79 to which a drive current is applied from the control circuitry 44 through amplifier 47 (FIG. 1). A plurality of fixed magnets 101 are mounted upon spaced upright mounting blocks 100 between which the coil 79 is positioned so as to complete the electromechancial drive arrangement for the scanner. The mounting blocks 100 are positioned upon and secured to an extension 90a of the upper tilt plate 90, as shown in FIG. 3, and also serve to mount the terminals 101a through which the coil 79 is connected to the drive circuitry. In order to rigidly secure the scanner 46 to the upper tilt plate 90, U-shaped mounting blocks 124 are bolted to the midpoint of each of the tensioning springs 121a, 121b through attachment plates 128. Each of the attachment plates has a threaded hole in the center thereof for receiving a set screw 127. Each screw extends freely through a passage 127a in the associated U-shaped mounting block 124, as shown in FIG. 7 Abutment blocks 125 are fixedly secured to the upper face of upper tilt plate 90 and provide surfaces against which the set screws 127 abut. Each mounting block 124 is also secured upon the upper face of upper tilt plate 90 by means of bolts 126 which are received in slots extending through the blocks so that loosening of the bolts permits the blocks to be shifted laterally with respect to the scanner. It will be appreciated that the mounting blocks 124 are thus free to slide upon the lateral faces of the abutment blocks 125 before the bolts 126 are fully tightened thereby permitting the tension springs 121a, 122b to be bowed outwardly from their innermost positions. This is done in order to apply the proper amount of tension in the leaf springs 120a and 120b so as to adjust the mechanical resonant frequency of the system to that desired. This mechanical resonant frequency should be set just slightly higher than the operating or drive frequency of the system so that the system will be energy efficient but so that the oscillatory drive will never pass through the resonance point wherein loss of control and damage to the structure could occur. It will be seen that by rotating the set screws 127 to move the plates 128 outwardly of the abutment blocks 125, the tensioning springs 121a, 121b bow outwardly to place an axial tensioning force on the springs 120a, 120b. Since each tensioning spring 121a, 121b can be adjusted separately through its associated set screw 127, it will be recognized that the separate adJustment of each side of the spring support system can be used to compensate for any asymmetry in the spring system construction to insure that a perfectly symmetrical drive arrangement is achieved.

It will be apparent that application of an alternating current to the coil 79 will shift the drive bar 78, and wafer w supported thereby, backwardly and forwardly in the direction of the x axis, i.e., in the opposed directions of arrow 110 (FIG. 3), at the frequency of the alternating current applied thereby, bowing the support springs 120a, 120b accordingly. This lateral vibratory movement, which comprises the scan linewidth of the system along the x axis on the wafer, is set for typical total excursion of about 2 millimeters.

The programming by which the computer system 22 controls the operation of the aforedescribed mechanical and optical apparatus of the present invention is shown in flow chart form in FIG. 6. Once the wafer w is appropriately positioned upon the vacuum chuck 89, the basic x-y planar drive mechanisms 34, 32 can be used to bring the wafer to a location beneath the optical imaging system 20 wherein the beam from laser 40 will overlie a particular site on the wafer. In a typical semiconductor wafer inspection operation, it is conventional to look at only a plurality of selected small areas or sites (e.g., four on the wafer rather than scanning the entire wafer because of time limitations. Once the wafer has been moved so as to locate under the beam from imaging system 20, a starting x, y location within the first chosen wafer inspection site by means of the x-y stage motor control circuitry 36 under command of signals from the computer 22, the focus control mechanism 28 is operated to bring the focus level to a focal plane $z_1$ which is chosen so that it will always be above the uppermost surface level of the wafer even if the wafer may vary somewhat in thickness or not lie in a perfectly horizontal plane (see the top figure in FIG. 8). The subroutine V(z) for obtaining and displaying a z (vertical) profile along a line (in the x direction) on the wafer is then carried out. This subroutine is shown specifically in FIGS. 7A, 7B, and 7C.

Referring first to FIG. 7A, the data collection phase, it will be seen that the focus control mechanism 28 is initially operated (through control circuitry 38) to bring the focal level of the optical system to its uppermost scanning level $z_1$ as explained previously. The vibratory scanning mechanism 46 is now operated to scan the beam from laser 40 along a line on the wafer while the control circuitry 44 (FIG. 1) samples the reflectivity data from photodetector 42 along the line at n samples (e.g., 512 samples) in a single (i.e., one-directional) scanning movement. These samples represent generally uniformly spaced positions $(x_1-x_{512})$ along the line from one lateral edge of the area or site to the other. As the spring system drive of scanner 46 brings the wafer back in the return direction along the scan line, no data is taken and the focus control mechanism 28 is operated to lower the focal level by an incremental distance (typically, a few hundredths of a micron). This procedure is repeated as the focal level (the z level) is successively lowered through m levels (e.g., 256 levels), as indicated in FIG. 7A, it being understood that at each level, 512 samples along the x direction will be obtained and all of this information will be stored within a memory in the computer system 22.

At the conclusion of the data gathering phase, the data will be processed in accordance with the programming shown in FIG. 7B. The data is saved within the computer in an array $x_i$ by $z_j$ wherein i (the spaced data taking positions along the x axis) will typically be about 512 while j ( the incremental focal levels of the optical system) will typically be about 256. Thus, the data storage for the profiling operation must accommodate 512 by 256 or approximately 131K bytes of information. As shown in FIG. 7B, the system starts at $z_i$ and $x_1$ and looks for the maximum peak value ($P_m$) and the reflectivity signal (R) at such peak value and also looks for the first peak value $P_1$. Thus, at data position $x_1$ along the x axis, the program steps through each z level (1 through 256) successively testing the reflectivity values to first locate a first peak value (i.e., where the reflected intensity first rises to a peak value and then drops off) and then to locate a maximum peak value (i.e.. the highest reflected intensity value). The maximum peak value will occur at that z level where the basic reflecting surface on the wafer lies precisely at the focal plane below the optical system, and the first peak (if there is a peak prior to the maximum value) will occur at that z level where a transparent or semi-transparent layer overlying the underlying basic reflecting surface lies precisely at the focal plane.

The foregoing process can be appreciated by the graphic illustrations of FIG. 8 which show a partial cross-sectional configuration for a typical wafer (in the uppermost figure) and the corresponding output displays for such profile provided in the graphics VDU 24b (FIG. 1). Thus, it will be seen that with an underlying base layer of silicon at a base layer A, a pair of spaced metallic lines of aluminum are provided at a level B and a higher insulating line of silicon dioxide is provided at a level D. Overlying the conductive material is some photoresist material of semi-transparent nature left after the etching process. The photoresist on the aluminum lines lies in a mound centered about level C while the photoresist on the silicon dioxide is at a uniform level E as shown. Thus, assuming that the data taking position $x_{10}$ is being processed and that this position lies within the silicon dioxide layer, as shown in FIG. 8, it will be appreciated that as the z levels are successively sequenced by the programming, that z level representing a focal plane at level E will provide a first peak reflectivity (R) value. As the z level approaches E, there will be a rise in the level of the corresponding signal R until it peaks at level E and then begins to drop off as the focal plane drops below level E. As the focal plane (z level) approaches level D however, another peak in the reflectivity signal is generated and this peak will be higher than the peak at level E since the silicon dioxide conductor at D is a non-transparent layer of photoresist at level E. As the focal plane or z level drops below level D, several other spurious peaks in the reflectivity signal may be generated of considerably smaller value than the peak at level D for optical reasons unimportant to an understanding of the present invention. Such peaks can be ignored. As shown in FIG. 7B, the computer will store the z level value ($z_j$) for the $x_{10}$ position and also the reflectivity value R at the maximum peak $P_m$. This process is repeated for each position along the x-axis, i.e., $x_1$ to $x_{512}$, with all of the foregoing information being recorded at each data taking position. For example, with reference to FIG. 8, it will be noted that at the $x_{90}$ position there will be no first peak separate from the maximum peak since only the silicon substrate level (at A) will reflect any light. Hence. at $x_{90}$ the system will not store a separate $P_1$ value.

The lower three graphs of FIG. 8 show the data display which is provided on the graphics video display unit 24b in three separate arrays. The upper graph represents z (depth at the wafer surface as referenced to the optical system) vs. x (linear location across the scan area). Referring now to the data display programming of FIG. 7C, it will be seen that the stored data (FIG. 7B) is utilized so that for each x position, each z level at which a maximum reflectivity signal was obtained is plotted and connected by a solid line. It will be recognized that this solid line comprises the z axis profile or cross-sectional profile of the wafer surface as shown in the top illustration of FIG. 8. The reflectivity at each maximum signal position is also plotted on a separate graph (R vs. x) as shown in FIG. 8 and connected by a solid line. Referring to this graph, it will be seen that the reflectivity for the highly reflective aluminum lines is considerably greater than that of the silicon dioxide line—as would be expected. Finally, referring again to the top graph (z vs. x), the first peak (where one was found distinct from the maximum peak) is plotted in dotted lines. As shown in FIG. 8. the dotted line plots are only found overlying the conductive lines therein since these are the only postions where multiple reflective layers of material are found.

It will be seen from the R vs. x graph of FIG. 8 that the underlying silicon substrate level has a relatively low reflectivity; the silicon dioxide layer has a higher reflectivity level; and the metallic aluminum layers exhibit the highest reflectivity levels. The wavy surface of the aluminum lines reflects the granular metallic nature of the relatively flat metallic surface which inherently has variable reflectivity levels therein.

Finally, a histogram is calculated and plotted and indicated in FIG. 7C and as shown in the lowermost graphical display in FIG. 8. The histogram utilizes the same data used in the uppermost graph (z vs. x), but it is plotted in a different manner to indicate on a statistical basis the z location of the maximum reflectivity signals. Thus, the number of pixels. i.e., x positions $x_1-x_{512}$, found at each z level where a maximum reflectivity signal was observed are plotted. Comparing the upper and lower graphs of FIG. 8 it will be seen that the lowermost level A has the highest number of pixels while the level of the metallic lines B has the next highest and that all of these pixels are closely centered about the A and B elevations. It will be noted that a bell-shaped curve is formed about the (level; such curve representing the photoresist material capping the aluminum layers with the peak representing the average level of such material. Finally, the D and E levels are the smallest and are appropriately spaced at the relatively highest focal depth levels. The significance of preparing and displaying such a histogram is that either operator selection or conventional computer graphical analysis techniques can be utilized to locate each of the indicated peaks (A-E) and the appropriate scan widths to clearly define their location. This data can then be used to both accurately measure the height of the lines on the chip pattern and to determine the specific levels of interest for further scanning of the adjacent area on the semiconductor wafer surface. Thus, as indicated in FIG. 7C. the automatic focusing function can be activated, wherein the z levels ($z_p$) for best focus in determining the various linewidths will be selected for scanning, or the user can manually select the desired levels for further scanning using, for example, levels approximately halfway between the observed "top" and "bottom" of each line. The system will thereafter be operated so that the focus control mechanism 28 will move the optical system to focus only on such selected levels rather than scanning the entire site area at each individual z level. In this way the z vs. x profile is utilized in an effective manner so that an entire site, i.e., the entire two-dimensional array of x and y positions, may be scanned to obtain the three-dimensional representation but only at a few selected depth levels without losing any relevant information and while keeping the amount of stored data at a manageable level.

As indicated in FIG. 7C, when the automatic focus selection function is activated, the automatically selected focus levels will be set and sequentially fed to the focus control circuitry 38 (FIG. 1) prior to each complete two dimensional scan at a given z level. When all of the selected z levels at a particular site have been scanned, the system is ready to rapidly shift the position of the wafer relative to the optical system (by translation stages 32. 34) so that a new site or area underlies the vibratory scanning area of the optical system, and the process can be repeated.

Returning now to the flow chart of FIG. 6, it will be seen that after the V(z) data has been collected and the z profile obtained and displayed, the user will determine a scan width ($x_{min}$, $x_{max}$) for each line to be subsequently measured as well as a threshold level ($T_L$) which is an adjustment factor for making appropriate linewidth measurements during further single depth level scans. The manner in which this latter step is accomplished is set forth in the subroutine shown in FIG. 10 and will be explained in greater detail hereinafter. Next, a nominal focus level ($z_{nom}$) is selected as the uppermost detectable layer on the wafer: for example, in the wafer cross-section of FIG. 8, top level E would represent the nominal focus level as indicated. Then each level of interest for scanning at or below level E would be defined by a focus offset or $\Delta z_j$ value with $\Delta z_j$ being defined as $z_{nom}$ minus the z level of scanning interest (e.g , level A. B, C, etc.). In the example provided level E would be set at j=1 and the $\Delta z_1$ value would be equal to 0 since level E is at the nominal focus level. Level D would be set at j=2 and the $\Delta z$ value would equal the incremental z distance between D and E. In a similar manner each of the other j values (j3–j5) would be set for levels C, B and A with the offset ($\Delta$) values being set at the corresponding z level differential with level E. Alternatively, for making future scans for measuring linewidths only, a level halfway between A and D would be set for j=1 and a level halfway between A and B would be set for j=2; thus, only two offset ($\Delta$) values are needed. These focus offsets are $\Delta z_j$ thus determined and stored. Then, with j being initially set equal to one, the focus control mechanism 28 is operated to move the focal plane to the first focal level (or not moved at all if, as in the present case, the upper level of interest is at the nominal focus level where the scanning operation will start), and the wafer area is scanned in the x, y plane in the manner previously described and as set forth in our aforementioned copending patent application Ser. No. 725,082. That is to say, the scanning mechanism 46 is operated in conjunction with a slow movement of y stage 32 so that reflectivity data is obtained for a matrix of closely spaced x positions and y positions throughout the scanned level. The reflectivity measurements R which are made at each of the x, y positions at the single z level can then be utilized for making linewidth measurements by the process to be described hereinafter. Then, assuming that more z levels are to be scanned at the wafer site, the j value is increased by one, the control mechanism is operated to lower the focal plane, and the process is repeated until scanning has been accomplished at each of the selected focus offsets.

After the final, and lowermost, z level is scanned, the program moves to a new site on the wafer. This is accomplished by first asking the question whether more sites are to be scanned on the wafer and, if so, utilizing gross movements of x, y stages 34, 23 to shift the wafer to the new scanning position. Upon reaching the new site, the system first moves through an autofocus step. In this step, the focus control mechanism 28 is operated to first bring the focal level of the optics to the $z_1$ level known to be above the uppermost layer of the wafer. Then. the z level is successively lowered until a peak in the reflectivity signal R is recognized by the computer circuitry from the data supplied by line scan pixel memory 54 (FIG. 1). The successive lowering is accompanied by the sequential scanning of a line in the x direction and comparing the data with the previously received data ignoring any signals below a given threshold value (to eliminate the effects of noise). Once a peak is recognized (as distinguished from a random spike or other spurious signal), the optical system will be at the nominal focus level, i.e., $z_{nom}$, with respect to the wafer surface (see FIG. 8). At this level, the aforedescribed scanning program will be repeated wherein the optical system will be vertically moved only to the selected levels of interest with a complete scan in the x, y plane at each such level being obtained. It will be recognized that autofocusing is needed as the wafer is shifted to permit a separate site thereon to be scanned since the mounting of the wafer on the scanner 46 might not set the wafer in a true horizontal plane. and, in addition, the etched top surface of the wafer might not be truly flat; hence, refocusing to find a known reference level at each new site is generally necessary. However, it will be noted that it is not necessary to collect new profiling V(z) data at each new site since the previously generated focus offsets ($\Delta z_j$) will generally remain constant.

In accordance with the present invention, the linewidth measurements are made by first accurately measuring the linewidth using the full profile data obtained along a single scan line at a plurality of incremental focal depths (i.e., that data compiled as shown in FIG. 8). Then, for the remainder of the semiconductor wafer area to be scanned adjacent to the line on which said profile was obtained, the scanning will be conducted at only a single focal depth, that depth which is most likely to provide an accurate linewidth measurement, and an adjustment to the obtained profile will be made based upon the precomputed relationship between the full profile data and the single scan data so as to provide an accurate linewidth measurement. It will be understood that the term "linewidth" will mean a measurement across a profile detail, or details, on the surface of the semiconductor chip. For example, referring to FIG. 11, the system can be used to measure directly across the conventional "lines" such as measurements a or b shown therein. Also, the system can measure the distance across the spaces between the lines such as measurements c and d shown in FIG. 11. Finally, the system can also be set to measure the pitch between lines such as measurements e, f, or g indicated in FIG. 11.

Referring now to FIG. 6, which illustrates the computer programming operation for the scanning operation, it will be seen that following the generation and display of the z profile, the operator first selects a scan width ($x_{min} \times x_{max}$) for each linewidth feature to be thereafter measured. As an example, an enlarged (and more realistic) view of the first line at the left hand side of FIG. 8 is shown in FIG. 13. The scan width is selected to move between $x_{min}$ at the left hand side and $x_{max}$ at the right hand side which positions are chosen so as to completely bracket the line catching any variations in linewidth which may occur at different positions spaced along the chip face. The program then determines the adjustment factor, or threshold level ($T_L$), which will be used in making the linewidth measurements from subsequent single scan data.

Since, as explained previously, the profile data provides a highly accurate representation of the surface features of the chip, the true linewidth has been arbitrarily selected as a point halfway between the bottom of the line (A) and the top of the line (D) (FIG. 13); that is to say, the level at which the linewidth is to be measured (indicated as $Z_p$) is automatically computed as A+D-A/z.

Referring now to the subroutine of FIG. 10, which shows the routine for computing the threshold level $T_L$, it will be seen that the computer after first determining $Z_p$ as the depth level at which the linewidth is to be measured then determines $W_p$, i.e., the actual linewidth from the profile data. This is accomplished using an interpolation method as shown in the subroutine of FIG. 12. Thus, $x_i$ is initially set as $x_{min}$ and the z value obtained at that x value is looked at to determine whether or not it is equal to or greater than $Z_p$. If it is not (which initially should always be the case), the $X_i$ value is incremented to the adjacent incremental x value and the process is repeated until the incremental x value moves past the $Z_p$ level. When this happens the left hand point x' is computed in accordance with the algorithm shown, i.e., x' being equal to $x_{i-1}$(incremental x value just prior to the last obtained x value) plus the incremental x value (the spacing between data taking points) times $$\frac{Z_p - Z_{i-1}}{Z_1 - Z_{i-1}}$$

with $z_{i-1}$ being the z value just below $Z_p$ and $z_i$ the z value just above $Z_p$. The program then continues with incremental x values being added to $x_i$ until the z value again falls below the value of $Z_p$. When this happens, the right hand measuring point x" is computed by using the algorithm shown, i.e., x" equals $$x_{i-1} + \Delta \times \left( \frac{z_{i-1} - Z_p}{z_{i-1} - z_i} \right),$$

where represents the distance between successive x positions (i.e., data points) along the scan line. Once the two values x' and x" are obtained, it is a simple matter to subtract the former from the latter to obtain $W_p$, i.e., the true linewidth for the feature indicated.

Referring back to FIG. 10 again. it will be seen that once $W_p$ is obtained the next step in the program is to call up that line scan data at the z level which is closest to the computed $z_p$. It is this level which will be used for all further scans to determine the linewidth of the chosen feature. A compilation of such data comprising the relative x values and reflectivity (R) or voltage (V) values from a scan at only the single elevation z is graphically shown in FIG. 15. Since the graphical representation of FIG. 15 was obtained by scanning at a single focal depth as opposed to the graphical represnetation of FIG. 13 which was obtained by scanning at a plurality of focal depths, it will be appreciated that the FIG. 15 representation will be more distorted than the FIG. 13 representation. Also, it will be noted that the FIG. 15 graphical representation might be askew with one side being higher than the other as, for example, when there is a slope on the chip surface. With the process of the present invention, an accurate measurement of the linewidth can still be made by separately determining the right hand and left hand measuring points.

In accordance with the present invention, a threshold level T is found between the maximum and minimum points on the single scan profile (FIG. 15) from which to measure for the linewidth $W_p$. This threshold value represents a fixed percentage of the total reflectivity, or voltage difference, between maximum and minimum points on the plot and is separately computed for each side of the line. As shown in FIG. 10, the threshold values are initially set at 0.1 and 0.9 so as to completely bracket the expected threshold position, i.e., somewhere in the midrange between the maximum and the minimum voltage levels. Once the threshold level T has been picked, the left and right hand voltage level measuring points are separately computed as shown in the subroutine of FIG. 14, i.e.. $V_{min}$ ($V_{max} - V_{min}$) T = $V_L$. Once a $V_L$ has been found, the corresponding $x_L$ value is then found by using the same interpolation routine as shown in and described with respect to FIG. 12; that is to say, successive incremental x values are chosen until the x values bracket the $V_L$ value and the interpolation routine is used to find the precise $x_L$ value. The V and x values on both sides of the line are separately computed using the same T ratio, and the difference between $x_L$ and $x_R$ is the computed linewidth w.

Referring again to FIG. 10, it will be seen that once a w value for T set at 0.1 and a w value for T set at 0.9 have been found, a straight linear interpolation is utilized to find the threshold value $T_L$ where presumably w will equal $W_p$. The threshold value T is then set to this $T_L$ value and a new w is calculated using the subroutine of FIG. 14. This w value is compared with the $W_p$ value previously obtained, and if it is less than a given miminum value (0.03 microns in the present system) this threshold value will be stored for future use in measuring the line in the adjacent wafer area. If the computed w value differs from the previously computed $W_p$ by more than 0.03 microns, a new interpolation is made between the latest $T_L$ value and the closest prior T or $T_L$ value that brackets $W_p$ to find a new $T_L$ value. The process is repeated until w equals $W_p$ within 0.03 microns. At this time this value is stored and used for subsequent line scans. That is to say, for all line scans at the chosen scanning depth $z_p$ in the remainer of the area to be scanned, a single set of data at the $z_p$ level will be provided similar to that from which the graph of FIG. 15 was obtained, and the linewidth $W_p$ will be determined by setting the $T_L$ value into the algorithm shown in FIG. 14 and noting the maximum and minimum voltage points on each side of the line. Thus, the highly accurate linewidth obtained from the initial profiling data is used as a standard for computing the linewidths from a single scan of data theraftér, and the linewidths thus obtained can be relied upon thereafter with a fairly high degree of confidence.

The programming process to find the superfocus" image is illustrated in the flow chart of FIG. 9. The "superfocus" image is the image of an entire scanned site or area on the wafer surface utilizing the information obtained by focusing the optical system at different levels. The image is displayed in the image display monitor 24a (FIG. 1) after the correct signals for the two dimensional video matrix are determined by the computer system 22 and stored in the video display memory 29. Once the wafer is moved so that the optics focus on the applicable site on the wafer, the V(z) data (for making the initial profile) is collected along a scan line at the center of the scanning field. This means that the x scanning line utilized is one halfway down the x-y maxtrix which is to be ultimately displayed in monitor 24a. The x-z profile is then obtained in the manner previously described, and a V(z) histogram (as in FIG. 8) is generated and displayed. The computer next asks the question whether or not the data provided by scanning along a single line is sufficient. For example, if the pattern within the entire x-y frame includes features which cannot be captured in a single x-line scan, then the y stage 32 must be driven to move the scanning mechanism 4-6 to a new location to provide a second x-line scan. This generates a new z profile which can be utilized for making linewidth measurements, and the z data obtained therefrom is simply added to the previously stored data in the histogram generating subroutine so that the data therein is accumulative. Thus, if there is a level found in the second x-line scan which was not present in the first x-line scan, a wholly new peak will be formed in the histogram. When it is determined that all of the necessary information has been obtained by a sufficient number of x-line scans, the program moves on to the process of obtaining the superfocus image.

First, the main peaks (or z levels of interest) in the histogram are identified in the manner previously pointed out. This can be done manually by the operator or accomplished by conventional computer graphical analysis techniques. The focus control meachanism 28 then moves the optical imaging system to focus on the first peak, i.e.. the first level of interest, and the entire x-y plane is scanned and the data recorded. This data is stored in a buffer, and the focus control mechanism moves the imaging system to focus at the second peak, i.e., the second level of interest wherein the process is repeated with the new data being added to the previously stored data in the buffer. This process continues until each level of interest is scanned with all of the data for each x, y position being accumulated in a plurality of x, y matrices. The data can then be displayed as a single plane of data on the image display monitor 24a with the data for any given (x, y) point on the screen being derived from the accumulated information from all of the scanned levels.

As one method of display of the superfocus image, it is possible to color code each individual level and display the maximum intensities at any given x, y position in accordance with the color coded level. This will produce a multi-color image with the different colors representing the different surface levels on the wafer. A second method of display involves simply adding all of the R signal values obtained at the different scan levels for each x, y position. An alternative to the foregoing method of display to improve the sharpness and quality of the image is to add the different R signal values for each x, y position but set a threshold level for each scan plane so that the grossly out-of-focus data would be set to zero. This threshold level could vary from plane to plane so that the sharpest possible image would be provided. Another alternative method of display would be to use only the maximum reflectivity signal at each x, y position so that the generated display image represents the x, z profile of FIG. 8 taken at each y level of the composite x, y matrix. The actual z vs. x profiles for each such y level could also be generated and stored. Such data could be displayed either graphically in an isometric (x, y, z) plot or used to modulate the intensity at each x, y position in a two dimensional display.

From the foregoing it will be seen that the initial generation of a z-axis profile or cross-sectional image of the wafer surface permits all of the relevant wafer scanning data to be subsequently obtained in a rapid and highly efficient manner. First, direct and highly accurate linewidth measurements can be made directly from the z-axis profile more easily and more accurately than by utilizing conventional linewidth scanning techniques, and second, the initial generation of a z-axis profile by the computer provides the means whereby the remainder of the adjacent area can be scanned at only a single level (for each distinctive line to be measured) with an adjustment factor being provided so that the single scan data can be correlated to the more accurate full profile data obtained initially.

Although the best modes contemplated for carrying out the present invention have been herein shown and described, it will be apparent that modification and variation may be made without departing from what is regarded to be the subject matter of the invention.

What is claimed is:

1. A method of making linewidth measurements within a given surface area on a semiconductor wafer or the like comprising scanning along an initial scan line in said area with a focused beam of energy and measuring a characteristic of the reflected beam from the wafer surface at a plurality of different focal depth levels to obtain a surface profile of the wafer along said scan line, making a linewidth measurement along said scan line based on the surface profile obtained in the preceding step, selecting the measured characteristic profile from a single scan at a single focal depth and determining the depth offset distance at which to make the linewidth measurement in order to have such measurement correspond with the linewidth obtained in the preceding step, and scanning the remainder of said wafer area at said single focal depth along scan lines parallel to said initial scan line and making linewidth measurements utilizing the depth offset distance determined by the preceding step.

2. The method of claim 1 wherein the measured characteristic of the beam comprises its intensity.

3. The method of claim 2 wherein the surface profile along the initial scan line is found by determining the focal depth level of a maximum intensity reflected beam signal at each of a plurality of closely spaced points along said scan line.

4. The method of claim 1 wherein the linewidth measurement of the surface profile along the initial scan line is found by selecting the upper and lower generally planar surface levels defining the line on the wafer surface, computing a representative measuring level between said upper and lower levels, and computing the distance between the intersections of the profile with said representative measuring level.

5. The method of claim 4 wherein the representative measuring level is generally the same as the single focal depth at which the remainder of the wafer area is scanned.

6. The method of claim 5 wherein the determination of the depth offset distance is made by finding the relative distance between maximum and minimum levels of the measured characteristic profile where the measured linewidth equals the surface profile linewidth, said relative distance being used as the depth offset distance for making subsequent linewidth measurements.

7. A method of making linewidth measurements within a given surface area on a semiconductor wafer or the like comprising scanning along an initial scan line in said area with a focused beam of energy and measuring a characteristic of the reflected beam from the wafer surface at a plurality of different focal depth levels to obtain a surface profile of the wafer along said scan line, selecting the upper and lower generally planar surface levels defining the line on the wafer surface to thereby obtain the line height, determining a representative depth level of the line, measuring along said profile at said representative depth level to obtain a profile linewidth, selecting a focal depth level related to said line, comparing the profile linewidth with the measured characteristic profile at the selected depth level to obtain an adjustment factor for directly measuring the linewidth from the measured characteristic profile at the selected focal depth level, and scanning at said selected focal depth the remainder of said wafer area along scan lines parallel to said initial scan line and making linewidth measurements utilizing the adjustment factor obtained by the preceding step.

8. The method of claim 7 wherein the measured characteristic of the beam comprises its intensity.

9. The method of claim 8 wherein the surface profile along the initial scan line is found by determining the focal depth level of a maximum intensity reflected beam signal at each of a plurality of closely spaced points along said scan line.

10. The method of claim 7 wherein the representative depth level is chosen midway between said upper and lower surface levels.

11. The method of claim 7 wherein the determination of the adjustment factor is made by finding the relative distance between maximum and minimum levels of the measured characteristic profile where the measured linewidth equals the surface profile linewidth, said relative distance being used as a depth offset distance between subsequent signal minimums and maximums for making subsequent linewidth measurements.

12. A method of making a linewidth measurement within a given surface area of a semiconductor wafer or the like comprising projecting a sharply defined beam through an optical imaging system to focus it on a small spot in said area and detecting a measurable characteristic of the beam reflected from said spot, relatively moving the projected beam and the wafer so that the spot scans along an initial scan line in said area, recording and storing a signal with respect to said measurable characteristic at a plurality of closely spaced positions along said scan line, successively changing the relative spacing between the imaging system and the wafer by a small incremental distance after each scan of said scan line to thereby change the focal depth of the system with respect to the wafer surface in a direction perpendicular to said scan line, separately determining the relative focal depth for each of said points along the scan line at which a signal most characteristic of a surface indication was obtained to provide a first surface profile of the wafer along said scan line, making a linewidth measurement from the first surface profile, selecting a single scan at one relative focal depth level and providing a second surface profile based on the measured characteristic signals at said points on said selected level, determining the depth offset distance at which to make the linewidth measurement in order to have such measurement correspond to the linewidth measurement obtained from said first surface profile, and scanning the remainder of said surface area at said one relative focal depth along scan lines parallel to said initial scan line and making linewidth measurements utilizing the depth offset distance determined by the preceding step.

13. The method of claim 12 wherein the measurable characteristic of the beam comprises its intensity.

14. The method of claim 13 wherein the linewidth measurement of the first surface profile is made by selecting the upper and lower generally planar surface levels defining the line on the wafer surface, computing a representative measuring level between said upper and lower levels, and computing the distance between the intersection of the profile with said representative measuring level.

15. The method of claim 14 wherein the determination of the depth offset distance is made by finding the relative distance between maximum and minimum signal levels of the second surface profile where the measured linewidth equals the first surface profile linewidth, said relative distance being used as the depth offset distance for making subsequent linewidth measurements.

16. A system for making linewidth measurements within a given surface area of a semiconductor wafer or the like comprising means for scanning along a scan line in said area with a focused beam of energy and measuring a characteristic of the reflected beam from the wafer surface at a plurality of different focal depth levels to obtain data representative of a surface profile of the wafer along said scan line, means for making a linewidth measurement along said scan line based on said data, and means for determining a profile depth offset distance from the data produced solely by a scan at a single focal depth level along said scan line so that the linewidth at said profile depth offset distance equals the linewidth obtained by said linewidth measuring means whereby the remainder of said area can be scanned at said single focal depth level to obtain sufficient data for making accurate linewidth measurements.

17. A system according to claim 16 wherein said means for scanning includes means for producing a laser beam and an optical imaging system for focusing said beam on a small spot on the wafer surface and wherein said measuring means includes a photodetector for measuring the intensity of the reflected beam from the wafer surface.

18. A system according to claim 17 wherein said optical imaging system is a confocal system including a pinhole for receiving both the transmitted beam to the wafer and the reflected beam from the wafer.

19. A system according to claim 16 wherein said means for scanning includes a confocal optical imaging system for focusing a beam on a small spot on the wafer surface and wherein said imaging system includes a pinhole for receiving both the transmitted beam to the wafer and the reflected beam from the wafer.

20. A system according to claim 19 wherein said scanning and measuring means includes means for determining the surface profile by determining the focal depth level of a maximum reflected signal from the wafer at each of a plurality of closely spaced points along said scan line.

21. A system according to claim 19 wherein said means for scanning includes means for oscillating said wafer in a linear path.

22. A system according to claim 21 wherein said means for scanning includes a drive means operable to move the wafer at right angles to said linear path at a slow linear speed relative to the oscillatory speed of movement in said linear path.

23. A system according to claim 16 wherein said scanning and measuring means includes means for determining the surface profile by determining the focal depth level of a maximum reflected signal from the wafer at each of a plurality of closely spaced points along said scan line.

* * * * *